Aug. 7, 1928.

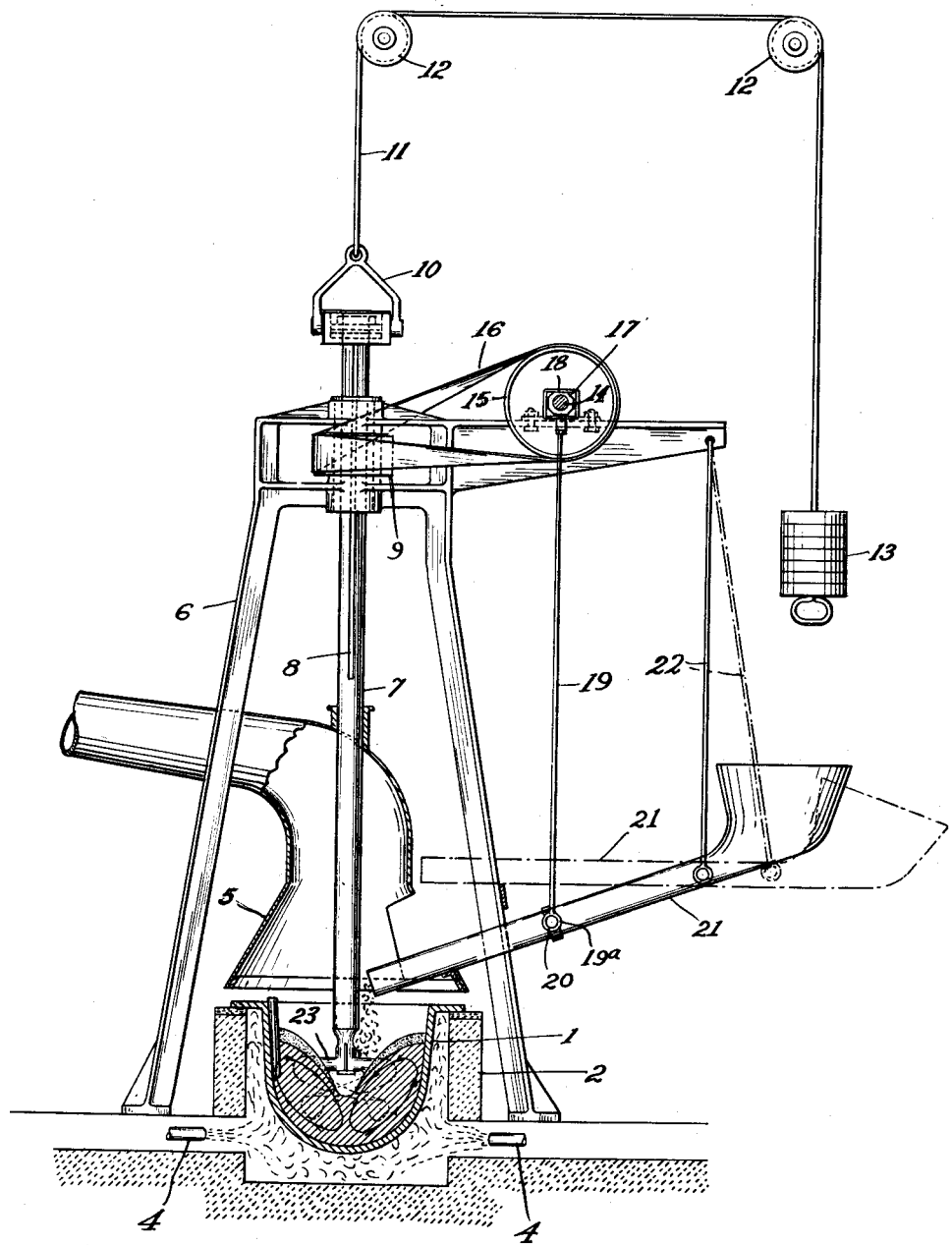

T. D. STAY ET AL 1,679,385

APPARATUS FOR RECLAIMING METALS

Original Filed Oct. 28, 1921  3 Sheets-Sheet 2

INVENTORS
T. D. Stay & C. O. Fosier
BY
Richey & Watts
ATTORNEY

Patented Aug. 7, 1928.

1,679,385

UNITED STATES PATENT OFFICE.

THERON D. STAY AND CHARLES O. TESSIER, OF CLEVELAND, OHIO, ASSIGNORS, BY MESNE ASSIGNMENTS, TO ALUMINUM COMPANY OF AMERICA, OF PITTSBURGH, PENNSYLVANIA, A CORPORATION OF PENNSYLVANIA.

APPARATUS FOR RECLAIMING METALS.

Original application filed October 28, 1921, Serial No. 511,021. Divided and this application filed November 20, 1925. Serial No. 70,322.

This invention relates to apparatus for refining metals and is particularly concerned with mechanical means for carrying out an improved metal reclaiming process adapted to the lighter, more readily oxidizable metals which is disclosed in copending application Serial No. 511,060, filed October 28, 1921.

This application is a division of our copending application Serial No. 511,021, filed October 28, 1921.

One object of our invention is to construct means for feeding finely-divided scrap metal into a melting furnace and quickly immersing it in a molten metal melting bath, for stirring the bath without causing harmful agitation thereof and for concentrating dross and other impurities carried by the scrap metal in a manner to facilitate separation of the impurities and clean metal.

Another object is to construct means for finely-dividing the dross and other impurities of a metal melting bath and maintaining it in a finely-divided state, and for quickly cooling and separating from the dross the molten metal associated therewith, all in a manner to prevent undue oxidation of the molten metal and to permit immediate re-melting of the recovered metal.

Another object is to construct a stirring paddle for use in a metal melting furnace which shall be capable of creating a desired stirring and circulation of the molten metal bath without harmful agitation thereof, for quickly submerging in the bath finely-divided scrap metal to be melted, and for causing a concentration of dross or impurities at the surface of the molten metal.

Another object is to construct a mechanical separating device for separating molten metal from dross comprising a new and improved combination of moving screens and tables so arranged as to cooperate in liberating the metal in molten form from the dross and in suddenly chilling the metal and finally completing the separation of the metal from the dross.

Another object is to provide complete apparatus for reclaiming scrap metals which will be substantially automatic in operation, will be easy and cheap to operate and will occupy the minimum amount of floor space.

Other objects will appear and be pointed out in the following specification wherein a preferred correlation and arrangement of parts is set forth in some detail.

In the drawings:

Fig. 1 is a side elevation, partly in section, of a melting furnace and associated apparatus constructed in accordance with our invention;

Figure 3:
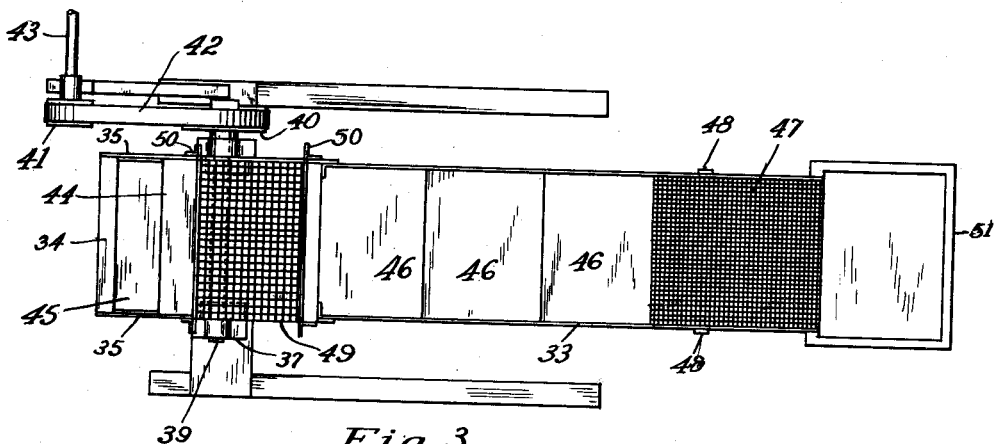
Fig. 3 is a plan view of the screens and tables shown in Fig. 2.

In practicing the process as disclosed in the copending application above referred to we employ a melting furnace comprising a pot 1, which may conveniently be mounted within a circular chimney-like brick structure indicated at 2 in Fig. 1. Oil or other fuel burners 4 which direct the flames against the pot may be mounted below the level of the floor or in any other position suitable to a proper heating of the pot and metal contained therein.

A hood 5 connecting with a flue (not shown) is arranged above the pot and is capable of being raised and lowered to permit removal of the pot and cleaning of the furnace. Suitable superstructure such as that indicated generally at 6, and consisting of uprights and cross-bars for mounting the necessary shafting, pulleys, etc., is provided adjacent the furnace. Extending vertically through the superstructure 6 is a shaft or hollow tube 7 provided with a longitudinally extending key 8 for engagement with a keyway (not shown) carried by pulley 9 slidably mounted on the shaft near its upper end. At the extreme upper end of the shaft 7 is a yoke 10 having a swiveled bearing connected thereto. A cable 11 running over pulleys 12 and having at its free end a counterweight 13 provides means for raising and lowering the shaft 7. If desired, the cable 11 or an extension thereof (not shown) may be attached to a hand-winch, (also not shown) to render positioning of the shaft controllable at will and to permit accurate positioning of the shaft at any desired point.

Adjacent the upper end of shaft 7 is located a transverse shaft 14 connected with some suitable source of power (not shown) and bearing a pulley 15 in alignment with the pulley 9 and connected thereto by a belt 16 whereby rotational motion of the shaft 14 is communicated to shaft 7. The shaft 14 carries an irregularly shaped section 17 upon which is mounted a yoke 18, the combination of this yoke and irregular section of the shaft resulting in a rapid vibratory motion of the yoke 18. To the underside of the yoke a rod 19 with a forked lower end 19ª is attached and extends downwardly to engage with trunnions 20 on a chute 21 and serves to transmit a vibrating or shaking motion to the chute. The outer end of the chute 21 is preferably supported by a cable 22 from the superstructure so that when not in use its inner end, which normally projects over the melting pot, can be elevated and rested upon the superstructure as is shown in dotted lines in Fig. 1, the rod 19 being disengaged from the trunnions 20 for this purpose.

Figure 4:
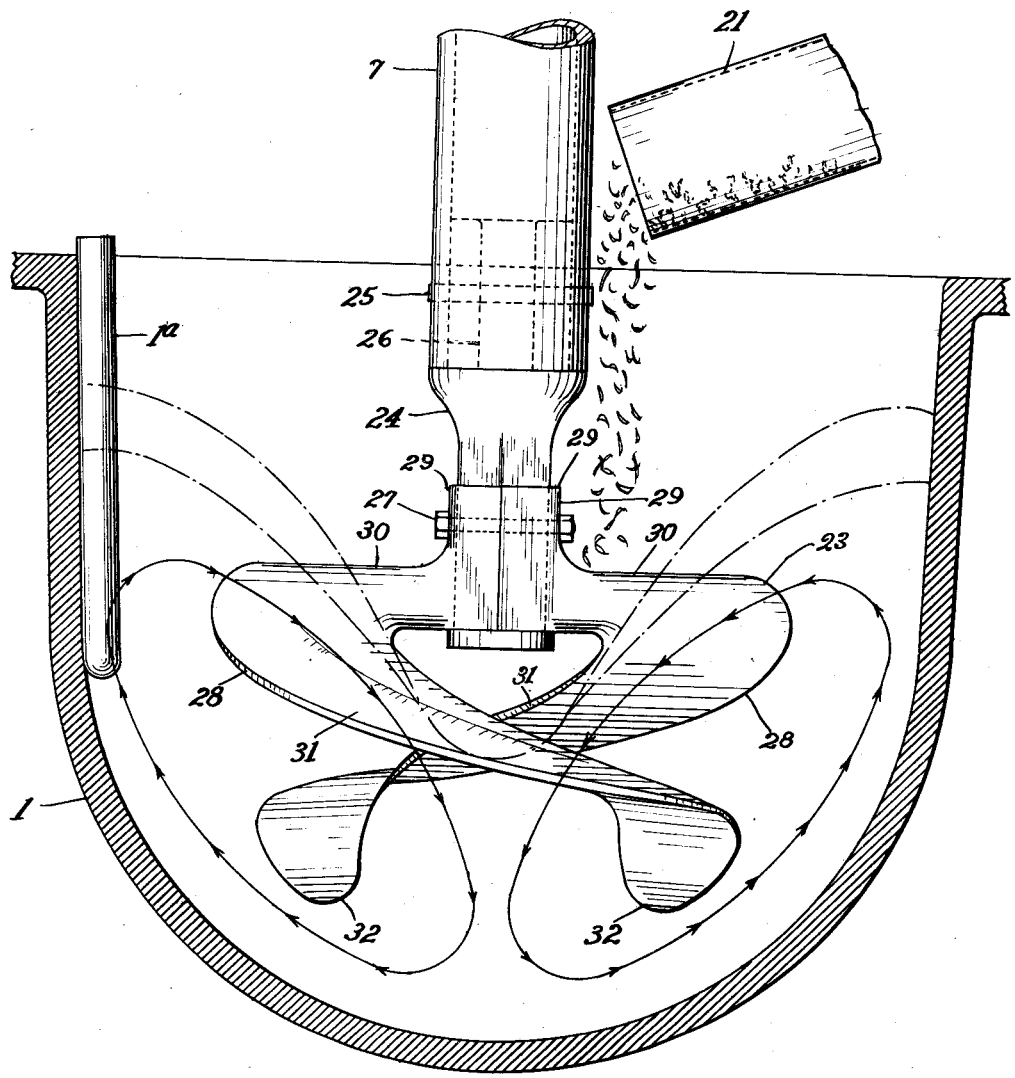
Fig. 4 is a sectional view through the melting furnace with the stirring paddle shown in elevation and in relation to the agitated molten metal and dross.

At the lower end of shaft 7 the stirring paddle 23 is securely fastened. As shown in Fig. 4, the shaft 7, being hollow, has a stud 24 inserted into its lower end and pinned in place by a through-pin 25. However, in case shaft 7 is solid an extension thereof of small diameter may be fitted into a hollowed portion 26 of the stud 24 and secured thereto by any suitable means. At the lower end of the stud 24 and secured thereto by a bolt 27 are a pair of oppositely disposed stirring blades 28. Each blade has a collar portion 29 adapted to seat on the stud 24, an outwardly extending portion 30 of so-called stream line formation from which a helically-shaped portion 31 of increasing pitch extends downwardly terminating in a tip portion 32 which is inclined abruptly to the underside of portion 31 and which also is provided with a front surface inclined outwardly.

When the two blades are assembled with the stud 24 and shaft 7 they comprise a stirring paddle capable of giving the liquid metal in which it rotates a downwardly and then outwardly directed motion, creating thereby a vortex at the center of the liquid and outwardly and upwardly directed currents along the sides of the pot as is indicated somewhat diagrammatically in Figs. 1 and 4. A baffle, 1ª, which may consist of a pyrometer rod jacket attached to the inner surface of the melting pot 1 retards the rotation of the liquid metal in a horizontal plane and directs the metal toward the vortex.

More than one baffle may be used, if desired, the principle upon which their action depends being the retardation of the swirling motion of the melted mass along the inner surface of the pot with a consequent deepening of the vortex by the action of the paddles at the proper slow speed at which the machine is operated.

Figure 2:
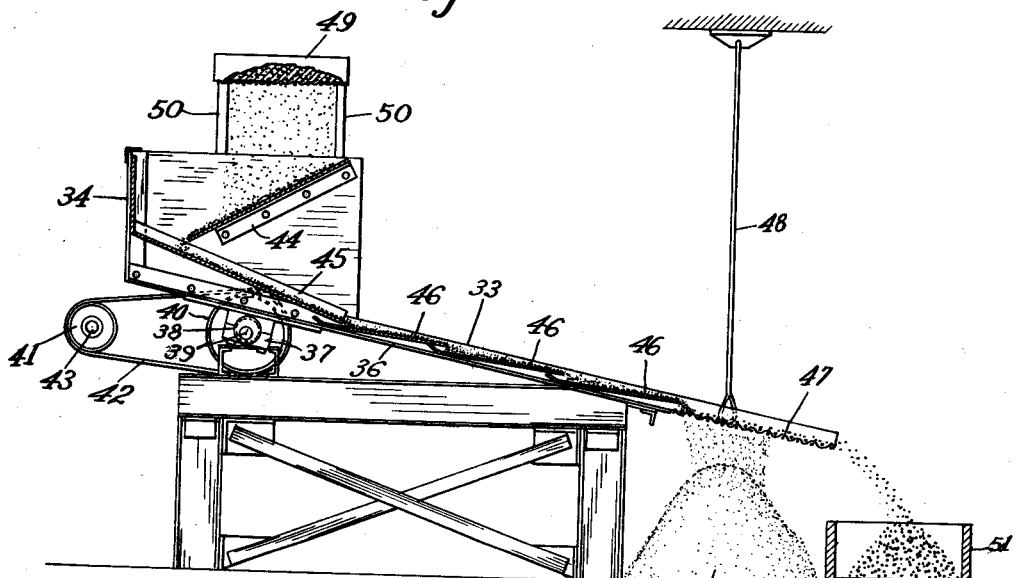
Fig. 2 is a vertical sectional view of the screens and tables for separating the dross and molten metal entrapped therein.

Adjacent the furnace 1 is located a device adapted to receive dross removed from the furnace and to convert it into a finely-divided condition from which the molten metal entrapped therein can readily separate. Various forms of apparatus could obviously be used for this purpose but a form which we have found satisfactory is shown in Figs. 2 and 3 of the drawings. This apparatus consists of a sheet metal frame 33 having an upright end 34, side portions 35, and an inclined bottom 36. This frame carries bearings 37 on its lower side near one end in which are journalled eccentrics 38 secured to a transverse shaft 39. This shaft is actuated by a shaft 43 connected to a suitable source of power, through pulleys 40 and 41 and a belt 42. By reason of the eccentric arrangement, the frame 33 is vibrated vertically and horizontally so as to give a forward throw to particles passing along the tables when shaft 39 is rotated.

Secured between the sides 35 of frame 33 are a plurality of cross tables 44 and 45, the former being inclined to the horizontal at a much steeper angle than the latter. Although several such tables could be employed, if desired, we preferably employ only two arranged substantially as shown.

If desired, the bottom 36 of frame 33 may consist of a single table but, as shown in Fig. 2, it consists of a series of tables 46 secured in overlapping position and adapted to receive material from table 45 and conduct it to the lower end of the frame 33.

A screen 47 secured in position at the extreme end of frame 33, is adapted to receive material from tables 46 and to permit fine dross material to escape therethrough while passing the larger particles of solidified metal on to its end.

In addition to the bearing support 37 for frame 33, rods or other suitable supporting means 48 are attached at the lower end of the frame and to an overhead support.

A screen 49 is mounted on uprights 50 secured to the sides 35 of frame 33 in position to discharge materials onto table 44.

In practice the operation of our improved apparatus is substantially as follows: A quantity of molten metal is first placed in the furnace and then the stirring paddle is lowered thereinto, by means of the raising of counterweight 2 and the consequent lowering of shaft 7, until the tips 32 of the paddle just clear the bottom of the pot. Rotating motion is imparted to the shaft 7 and stirring paddle 23. At the same time chute 21 is lowered into the position shown by full lines in Fig. 1, the rod 19 being engaged with the trunnions 20. Scrap metal in the form of turnings, borings, foil or the like is placed in the open end of the chute 21 and by reason of the vibrating motion imparted to the chute by the rod 19 and yoke 18 it is caused to feed in a slow, substantially continuous stream into the vortex created in the center of the molten metal in the furnace by the rotation of the stirring paddle 23. Due to the downwardly directed currents at the center of the molten bath, the scrap metal is at once drawn underneath the surface of the molten metal and retained thereunder by the upwardly directed currents flowing along the walls of the pot for a sufficient length of time to permit melting. Impurities, oxides and other materials constituting dross collect at the surface of the molten bath where combustible matter is ignited and burns. Due to the fact, however, that the dross has about the same specific gravity as certain light metals such, for instance, as aluminum, magnesium, etc., not all of the dross separates itself from the metal and rises to the surface. Consequently when the pot has become filled to capacity with metal and dross, the stirring paddle, which has been gradually raised as the level of the molten metal rose in the furnace, is now lowered to the bottom of the furnace and allowed to rotate in this position for a period of time whereby the dross entrained in the metal becomes concentrated at the surface thereof.

The paddle is next removed from the furnace by elevation of the shaft 7, chute 21 is moved to the position indicated by dotted lines in Fig. 1 and after the dross on the surface of the molten metal has been treated by chemical reagents or otherwise it is removed and placed in screen 49. Considerable molten metal drains out of the dross as it is being removed from the pot but the metal still retained therein is carried along with the dross to the screen 49 which is being rapidly vibrated and which operates to disintegrate all lumps and to reduce the dross to a finely-divided condition from which the molten metal can rapidly escape. The fine dross and molten metal passing through the screen 49 falls upon the steeply inclined table 44 down which it travels rapidly and by which it is tossed upwardly by the vibrations of the table.

The effect of the rapid movement along the table 44, together with the fact that the metal is subjected to the chilling action of the surrounding atmosphere, results in almost instantaneous chilling of the molten metal to a temperature below that at which it readily oxidizes.

Upon passing to table 45 the speed of the movement forward of the metal is somewhat diminished but it is caused to bounce along due to the vibration of the table and in many cases to unite with other globules of the still molten metal. By the time the material has reached the end of tables 46 it has solidified and will pass over the screen 47 and into a receptacle 51 while the finely-divided dross finds its way through the screen and collects as indicated at 52 in Fig. 2.

The metal in receptacle 51 which is substantially free from all impurities and which is only slightly oxidized may then be returned to the furnace 1 and remelted. Previous to the return of this recovered metal, however, it is necessary to remove from the pot the excess of molten metal, retaining therein, however, sufficient molten metal to form a bath for the next batch of scrap metal to be refined.

We do not desire that our invention should be limited to the specific parts, devices or arrangements above-described since other means suitable for accomplishing our objects and falling within the limits of our invention may occur to those skilled in the art. Accordingly, the scope of our invention is to be defined and limited only by what is claimed.

We claim:

1. Apparatus, for use in the recovery of readily oxidizable metal from metal-containing dross, comprising in combination, means for reducing highly heated dross to a finely divided condition thereby liberating molten metal entrapped therein, movable means for quickly agglomerating and then solidifying the molten metal so liberated, and means to actuate said movable means.

2. Apparatus, for use in the recovery of readily oxidizable metal from metal-containing dross, comprising in combination, means for reducing highly heated dross to a finely divided condition thereby liberating molten metal entrapped therein, movable means for quickly agglomerating and then solidifying the molten metal so liberated, means to actuate said movable means, and means for separating the solidified metal from the dross.

3. Apparatus, for use in the recovery of readily oxidizable metal from metal-containing dross, comprising in combination, means, including a movable screen, for reducing highly heated dross to a finely divided condition thereby liberating molten metal entrapped therein, movable means for quickly agglomerating and then solidifying the molten metal so liberated, and means to actuate said movable means.

4. Apparatus, for use in the recovery of readily oxidizable metal from metal-containing dross, comprising in combination, means for reducing highly heated dross to a finely divided condition thereby liberating molten metal entrapped therein, movable means, including a movable table, for quickly agglomerating and then solidifying the molten metal so liberated, and means to actuate said movable means.

5. Apparatus, for use in the recovery of readily oxidizable metal from metal-containing dross, comprising in combination, means for reducing highly heated dross to a finely divided condition thereby liberating molten metal entrapped therein, movable means, including an inclined movable table, for quickly agglomerating and then solidifying the molten metal so liberated, and means to actuate said movable means.

6. Apparatus, for use in the recovery of readily oxidizable metal from metal-containing dross, comprising in combination, means for reducing highly heated dross to a finely divided condition thereby liberating molten metal entrapped therein, movable means, including a plurality of inclined tables, for quickly agglomerating and then solidifying the molten metal so liberated, and means to actuate said movable means.

7. Apparatus, for use in the recovery of readily oxidizable metal from metal-containing dross, comprising in combination, means for reducing highly heated dross to a finely divided condition thereby liberating molten metal entrapped therein, movable means, including sheet-metal tables, for quickly agglomerating and then solidifying the molten metal so liberated, and means to actuate said movable means.

8. Apparatus, for use in the recovery of readily oxidizable metal from metal-containing dross, comprising in combination, means, including a movable screen, for reducing highly heated dross to a finely divided condition thereby liberating molten metal entrapped therein, movable means, including a movable table, for quickly agglomerating and then solidifying the molten metal as liberated, and means to actuate said movable means.

9. Apparatus, for use in the recovery of readily oxidizable metal from metal-containing dross, comprising in combination, means, including a movable screen, for reducing highly heated dross to a finely divided condition thereby liberating molten metal entrapped therein, movable means, including a movable table, for quickly agglomerating and then solidifying the molten metal so liberated, means to actuate said movable means, and means for separating the solidified metal from the dross.

10. Apparatus, for use in the recovery of readily oxidizable metal from metal-containing dross, comprising in combination, movable means for reducing highly heated dross to a finely divided condition thereby liberating molten metal entrapped therein, movable means for quickly agglomerating and then solidifying the molten metal so liberated, and means to actuate both the above movable means simultaneously.

11. Apparatus, for use in the recovery of readily oxidizable metal from metal-containing dross, comprising in combination, means for reducing highly heated dross to a finely divided condition thereby liberating molten metal entrapped therein, movable means, including a vibratory table, for quickly agglomerating and then solidifying the molten metal so liberated, and means to actuate said movable means.

In testimony whereof we hereunto affix our signatures this 23d day of October, 1925.

THERON D. STAY.
CHARLES O. TESSIER.